June 20, 1933.  A. J. GLICK  1,914,946
FUEL CONSUMPTION INDICATOR
Filed Dec. 12, 1928    2 Sheets-Sheet 1
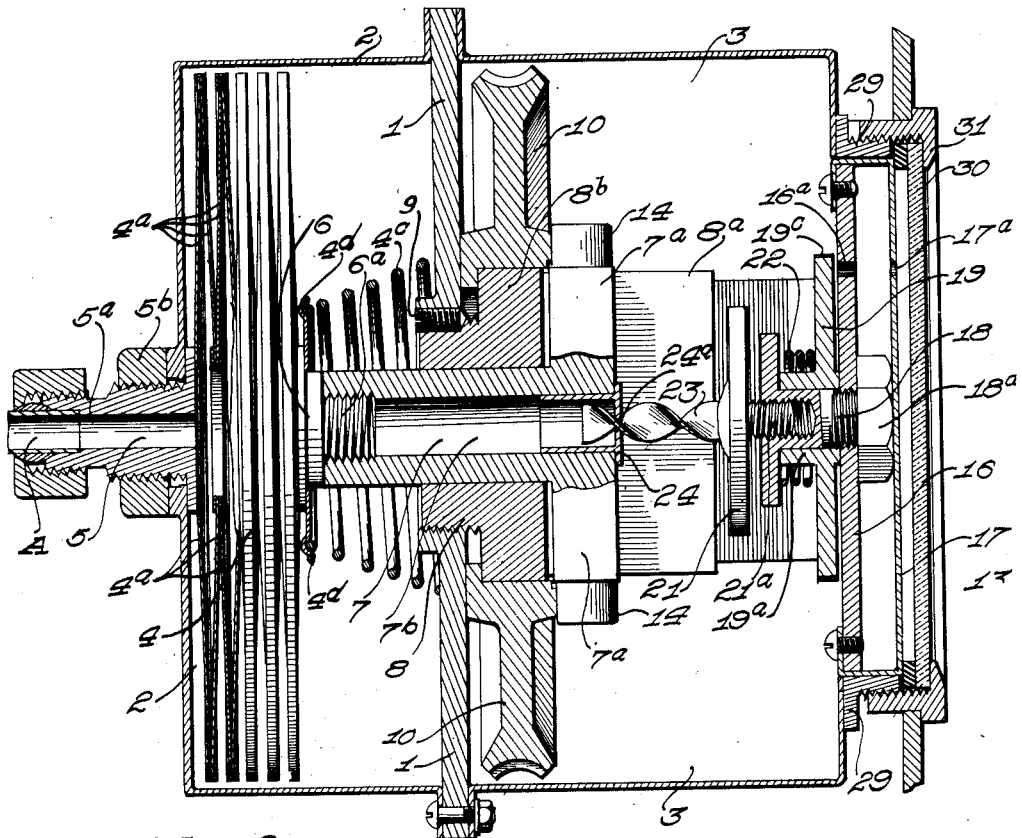
FIG. 2
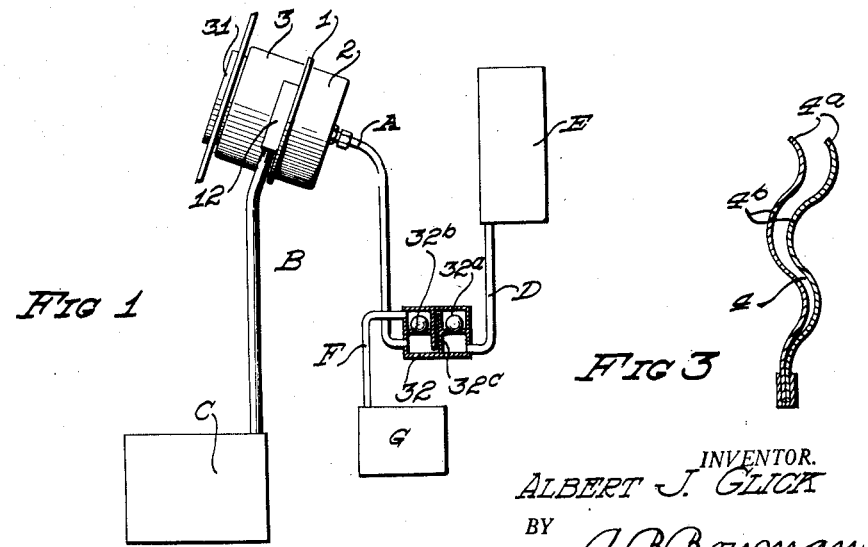
FIG 1
FIG 3
INVENTOR.
ALBERT J. GLICK
BY A. B. Bowman
ATTORNEY June 20, 1933. A. J. GLICK 1,914,946
FUEL CONSUMPTION INDICATOR
Filed Dec. 12, 1928 2 Sheets-Sheet 2
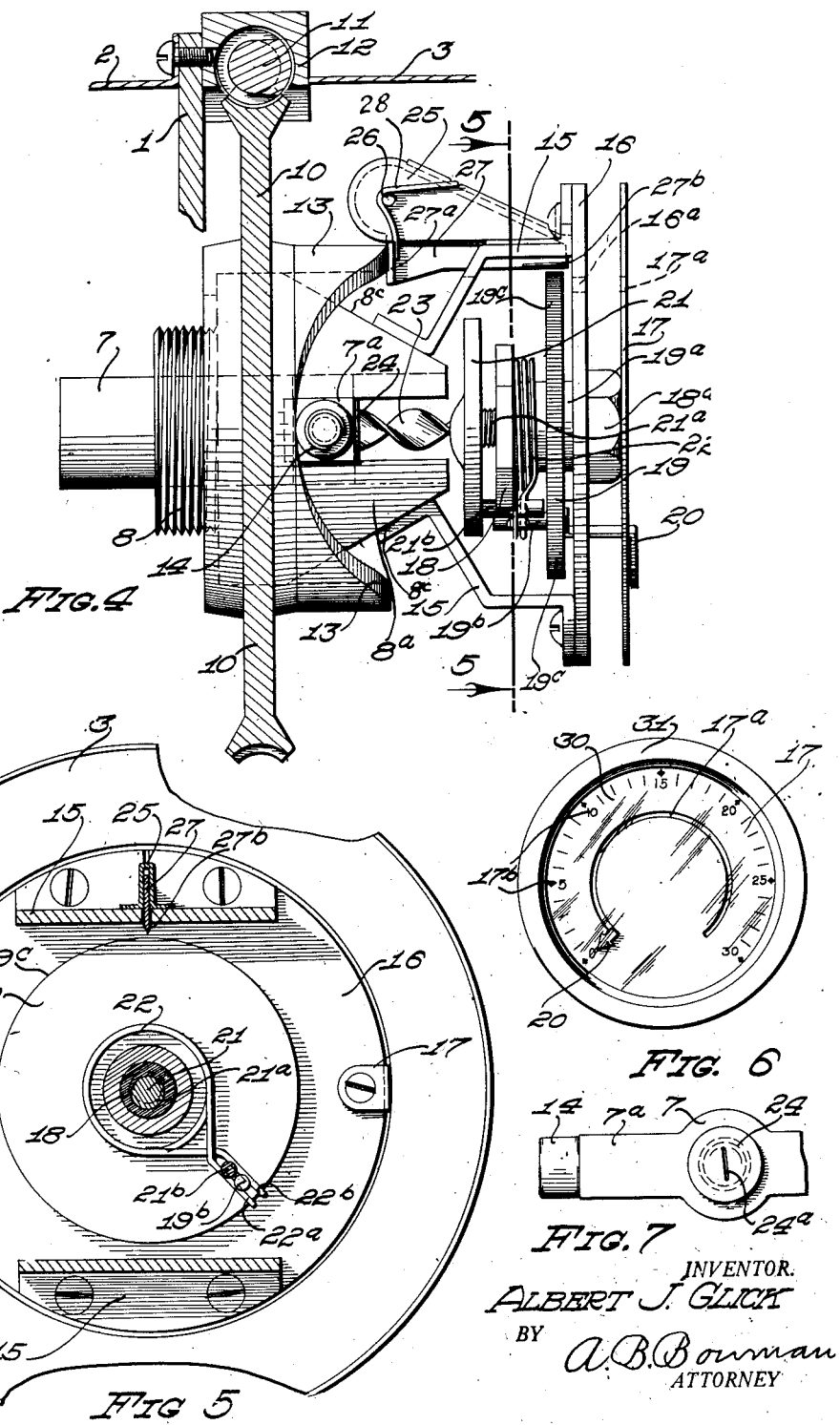

Patented June 20, 1933

1,914,946

UNITED STATES PATENT OFFICE

ALBERT J. GLICK, OF SAN DIEGO, CALIFORNIA

FUEL CONSUMPTION INDICATOR

Application filed December 12, 1928. Serial No. 325,424.

My invention relates to fuel consumption meters and the objects of my invention are: First, to provide a meter of this class which indicates the fuel consumed during a given interval of time or given unit of distance depending upon the mechanism to which it is attached; second, to provide a meter of this class in which the pointer does not fluctuate but shifts at certain predetermined intervals and therefore may be made to register the ratio of fuel used to a unit distance; third, to provide a meter of this class which does not in any way interfere with the engine to which it is attached; fourth, to provide a meter of this class which if it should cease to function, will not interfere with the operation of the conventional fuel system; fifth, to provide a meter of this class which is especially adapted for the accurate measuring of small quantities of fuel; sixth, to provide a meter of this class in which a bellows arrangement draws in fuel from the fuel supply during a small interval of time, then discharges the fuel into the engine as needed during the second interval of time, whereupon mechanism connected with the bellows registers the amount of fuel discharged therefrom, which fuel is the amount consumed by the engine while said bellows was drawing upon the fuel supply and while said bellows was drawing upon the fuel supply and while said bellows was moving to collapsed position; seventh, to provide a meter of this class which is not dependent upon the velocity of the fuel measured, thereby eliminating a great deal of the inaccuracy of automatic fuel measuring; eighth, to provide a meter of this class in which the working parts are separated from the fuel, thereby permitting satisfactory lubrication and prolonging the life of the device; ninth, to provide a device of this class in which there are no packing joints to come loose and thereby cause a reduction in accuracy; tenth, to provide a device of this class which will operate indefinitely without adjustment or repair; eleventh, to provide a meter of this class which is especially adapted for mounting with other instruments upon the dash board of an automobile, and, twelfth, to provide a meter of this class which is extremely simple of construction proportional to its functions, durable, efficient in its action and which will no readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a diagrammatic view of my fuel consumption meter showing its relationship to other portions of an automobile; Fig. 2 is a sectional elevational view of my fuel meter with parts and portions shown in elevation to facilitate the illustration; Fig. 3 is an enlarged fragmentary sectional view through a portion of the bellows showing the desired construction thereof; Fig. 4 is a top or plan view of my fuel consumption meter with the casing 3 removed and showing the gear 10, pinion 11, housing 12 and casing 2 and 3 fragmentarily and in section to facilitate the illustration; Fig. 5 is a sectional view thereof through 5—5 of Fig. 4; Fig. 6 is a reduced elevational view of the indicating dial, and Fig. 7 is a fragmentary end elevational view of the bellows actuating rod with the screw driving member shown in position.

Similar characters of reference refer to similar parts and portions throughout the several views of the drawings.

Partition member 1, bellows casing 2, registering mechanism casing 3, bellows 4, coupling members 5 and 6, bellows operating rod 7, guide and bearing member 8, lock screw 9, worm gear 10, worm 11, worm housing 12, cam member 13, cam rollers 14, bracket members 15, dial base 16, dial 17, bearing member 18, dial pointer support 19, dial pointer 20, drive disc 21, coil spring 22, screw member 23, screw drive member 24, locking lever housing 25, locking lever pin 26, locking lever 27, locking lever spring 28, casing collar 29, dial cover 30, dial cover support 31 and valve member 32, constitute the principal parts and portions of my fuel consumption meter.

A partition member 1 separates a bellows mechanism from a registering mechanism. Secured to one side of the partition member is a bellows casing 2 and to the other side thereof a registering mechanism casing 3.

Mounted within the bellows casing 2 is a bellows 4. The bellows is formed of a plurality of annular rings 4a, the inner peripheries of which are considerably smaller than their outer peripheries. Each ring 4a is provided with a plurality of annular corrugations 4b, as indicated in Fig. 3. These corrugations are omitted in Fig. 2 in order to facilitate the illustration. The several ring members are secured to each other in such a manner that the outer periphery of the first ring is secured to the outer periphery of the second ring, which in turn is secured by its inner periphery to the inner periphery of the third ring, and so on. All of these joints are sealed together so as to be fluid tight. The several pairs of rings secured at their outer peripheries form a plurality of disc shaped chambers communicating with each other through the central openings in the rings.

The casing 2 is cup shaped and the side walls thereof are deep enough to allow the maximum movement of the bellows. The end wall of the bellows casing 2 is closed except for an opening opposite the central openings of the various rings. Secured over the opening in one of the outside rings of the bellows is a coupling member 5 having a passage 5a extending therethrough and communicating with the chambers formed within the bellows. This coupling extends through the opening in the casing 2 and is externally threaded so as to receive a nut 5b which rigidly secures the one end of the bellows to the casing 2, as shown in Fig. 2 of the drawings. The extended end of the coupling member 5 is adapted to receive the end of a pipe line A in such a manner that the passage 5a within said coupling member communicates with said pipe line.

To the other end ring member 4a is secured a second coupling member 6. This coupling member has no passage therein but is provided with an externally threaded portion 6a so as to be secured to a bellows operating rod 7. The bellows operating rod 7 extends through a guide and bearing member 8 into the registering mechanism portion of the device of which it forms a part.

A spring 4c, its one end portion resting in a retainer 4d supported by the coupling member 6 and its other end pressing against the partition 1, tends to force the bellows to a collapsed position.

The guide end bearing 8 has a transversely extending flange 8b at one end and is screwably mounted at its other end in the partition member 1. The inner surface of said flange is spaced slightly from the partition member 1. A lock screw 9 prevents relative movement of the bearing member and partition member when the bearing member is in position. The flange 8b forms a bearing surface for rotatably supporting a worm gear 10. A portion of the worm gear extending between the partition and the flange 8b so as to be held against axial movement, as shown in Fig. 2.

A worm 11 mounted in a worm housing 12 supported at the one side and at the edge of the partition member 1 drives the worm gear 10. The worm communicates through a driving cable B, which is similar to a speedometer cable, with a suitable revoluble portion of the engine with which the meter is to be used. If my device is used in connection with an automobile it is most convenient to connect the cable B with the transmission C in a manner similar to the usual arrangement for speedometers.

Secured to or made integral with the worm gear 10 is a cam member 13. This cam member is annular and is in concentric relation to the bellows operating rod 7. The cam is provided with two diametrically opposed major points separated by two similarly opposed minor points, as shown best in Fig. 4. The end of the bellows operating rod 7 remote from the bellows is provided with two radially extending arms 7a which terminate just short of the cam member 13. The ends of these arms support cam rollers 14 which are adapted to rotate upon the cam 13. Thus rotation of the cam member 13 due to the movement of the worm gear causes a reciprocal movement of the bellows operating rod, thereby operating the bellows 4.

The bearing member 8 has two spaced projecting portions 8a. The slot formed by the space between these portions is of sufficient width to slidably receive the arm 7a of the bellows operating rod, thus preventing the rotation of the bellows operating rod with the cam.

The remote sides of said portions 8a are preferably beveled as at 8c. Each of the beveled sides form a seating for a corresponding bracket member 15. The inner end parts of said members are secured to said portions 8a respectively and the members are bent so that each has a part which extends substantially at right angles to the corresponding seating, and an adjacent part substantially parallel to the axis of the worm gear 10, and finally the two members are bent so that their outer end portions extend at right angles to said axis in opposite directions. To said outer end portions is secured a circular dial base 16 concentric with said gear axis.

The dial base 16 is provided with an arcuate slot 16a therein which extends preferably for three-quarters of a circle. A dial 17 is secured to the dial base. Said dial is provided with an arcuate slot 17a similar to and in registration with the slot 16a of the dial base.

Screwably mounted in the dial base 16 concentric with the slot 16a, and locked relative to said dial base by means of a lock nut 18a, is a bearing member 18. The bearing member extends towards the partition 1 and supports a collar portion 19a of a dial pointer support 19, the one edge of which rests against the inner side of the dial base. The dial pointer support 19 is in the shape of an annular disc extending outwardly from its collar 19a and is slightly larger than the radius of the arcuate slot 16a. A dial pointer 20 is mounted on the dial pointer support 19 and projects through the arcuate slots 16a and 17a, then extends radially so as to register with a suitable scale 17b placed upon the dial 17, as indicated in Fig. 6.

Rotatably mounted relative to the bearing 18 is a drive disc 21. This disc is adapted to revolve about three-quarters of a turn in the structure shown of approximately the same number of degrees through which the slots 16a and 17a pass. As a means, to be described later, limits this turning movement, the drive disc may be screwably mounted within the bearing member by providing ordinary screw threads on its axle 21a which fit in corresponding threads within the bearing member 18. The consequent longitudinal movement of the drive disc in no way interferes with its operation.

An arm 21b extends from a point near the periphery of the drive disc 21 towards the dial pointer support 19. A similar arm 19b extends from the dial pointer support 19 towards the drive disc 21. The arm 19b is positioned a greater distance from the common axis of the two members so as to clear the arm 21b, as shown best in Fig. 5. These arms 21b and 19b are held in resilient, radial alinement with each other by means of a coil spring 22. The one end 22a of this spring extends on the one side of the two arms, while the other end 22b of the spring, after coiling around the collar of the dial support, engages the other side of these arms. Thus movement of the drive disc relative to the dial pointer support in either direction increases the tension of the coil spring causing the dial pointer support, unless held from rotation, to move with the drive disc.

The drive disc is operated by a screw member 23 which is in axial alinement with the bellows operating rod 7. The bellows operating rod 7 is provided with an opening 7b therein deep enough to receive the screw member when the rollers are at the maximum points of the cam. A screw drive member 24 fits into the end of this opening 7b. The drive member is provided with a slit 24a therein which receives the screw member. Thus a reciprocal movement of the bellows operating rod 7 causes a rotation of the screw member and a movement of the pointer 20 unless the pointer support is held from movement. In the structure shown, the maximum rotation of the screw member moves the pointer 20 from one extreme of the slots 16a and 17a to the other extreme thereof, causing the pointer to register from zero to the highest point of the scale 17b.

If desired, of course, more or less rotation of the screw may be provided, but this amount is sufficient for practically any use of the mechanism.

Secured to the outer side of one of the brackets 15 is a locking lever housing 25 which consists of a piece of material bent double leaving a small slit between the two portions, as shown in Figs. 4 and 5. The housing extends to a point outside of the cam 13 and is adapted to receive a pivot member 26 in said extended portion. A locking lever 27 is mounted upon this pivot in such a manner that a riding portion 27a engages the peak portions of the cam 13, and an extended end 27b of the locking lever is provided with a knife edge which engages the periphery of the dial pointer support 19.

Serrations or small transversely extending teeth 19c are provided in the periphery of the pointer support, as indicated in Figs. 2 and 4. A suitable slot is provided in the upper bracket 15 to permit movement of the locking lever 27. A spring 29 tends to force the riding portion of the locking lever against the cam and the extended portion 27b clear of the periphery of the dial pointer support.

Thus, the dial pointer support 19 can only move when the riding portion 27a of the locking lever is engaged by one of the major points of the cam 13 and the extended end 27b is raised clear of the pointer support. Therefore, for every half revolution of the cam 13 in the structure shown, the dial pointer support is released long enough to shift so as to cause the pointer to indicate the amount of fuel used during the previous half revolution.

The registering casing mechanism 3 extends over the before described mechanism and is flanged inwardly to a point just clear of the outer edge of the dial base 16. A casing collar 29 is secured to the said flange. This casing collar is externally threaded for receiving the dial cover support 31. Supported between the dial cover support and the outer edge of the collar 29 is a transparent dial cover 30.

The device may be mounted on the dash board of the vehicle used in connection therewith or in any other suitable place if used in connection with other types of engines, in such a manner that only the dial need show.

The pipe A extends to a double valve 32 connected in the pipe line between the vacuum tank and carburetor, if used in connection with automobiles, or between the fuel supply and the fuel mixing apparatus of other types of engines. The valve member 32, consists of two check valve portions 32a and 32b. The valve portion 32 is arranged in such a manner that the pressure of fuel coming through the pipe line D communicating with the source of supply, such as the vacuum tank E, tends to lift it. A passage 32c extends from the outlet side of the check valve 32a to the inlet side of the check valve 32b. The pipe line A communicates with the intake side of the check valve 32b, while the pipe line F, which is connected with the carbureter G, communicates with the outlet side of the check valve 32b. Thus a suction created in the pipe line A closes the valve 32b, opens the valve 32a, and causes the fuel to flow from the vacuum tank E directly into the bellows 4, the supply to the carbureter being shut off. The period during which this occurs is during the time the cam 13 is expanding the bellows and is so short a period that there is no material effect upon the operation of the carbureter. As soon as the bellows is expanded it is released from the action of the cam and creates a slight pressure in the pipe line A. The conventional valves in the carbureter limit the amount of fuel which comes from the bellows and therefore the cam rollers lag behind the cam. As pressure in the line A lifts the valve 32b and closes the valve 32a, no fuel passes back to the vacuum tank but is delivered directly from the meter to the carbureter. Thus all the fuel which goes to the carbureter first passes through the meter, thence flowing to the carbureter.

My fuel consumption meter operates as follows: During the expanding of the bellows 4 at which time fuel is drawn from the source of supply, the rollers 14 are riding upon the cam 13, thereby creating the force necessary to operate the bellows. When the rollers reach the major points of the cam the bellows are in their expanded position and full of fuel. The speed of rotation of the cam is such that the time interval during which the bellows is expanding and the supply of fuel to the carbureter is cut off is so short that the fuel content of the carbureter is not entirely consumed before the replenishment commences. The bellows is made large enough so that the quantity of fuel contained therein is considerably greater than the quantity needed during the intervals of time in which the connections between the bellows and carbureter is cut off even when the engine is running at full speed. The cam rollers and bellows operating rod therefore, lag behind the cam when the cam is moving from its major to its minor points. The rollers not being in engagement with the cam, the movement of the bellows is dependent upon the amount of fuel drawn out through the valve 32 into the carbureter. The amount of fuel used during this period is of course dependent upon the amount of fuel needed in the carbureter to replace the amount of fuel used during the preceding interval of time in which the bellows was expanded plus the amount needed while the bellows is contracting. Thus, if the motor is running idle and the carbureter is using but little fuel, the movement of the bellows is slight and the rollers only engage the major portions of the cam. As the movement of the screw member 23 is dependent upon the reciprocal movement of the bellows there is but slight movement thereof at such times. On the other hand there is a maximum movement of the bellows when the engine is running at full speed or when running faultily and therefore requiring considerable fuel.

With the locking lever mechanism removed, the pointer oscillates during each movement of the bellows through an angle equal to the angular movement of the screw member. When the cam rollers are approximately opposite the minor points of the cam the rollers are not in engagement therewith but are held spaced therefrom by the fuel within the bellows. At this point the dial pointer indicates the amount of fuel used during the half turn of the cam just before the last one and the pointer is at its maximum point for that second preceding half turn. The locking lever unlocks the pointer support immediately thereafter, thereby permitting the pointer to shift to the position which indicates fuel used during the last preceding half turn of the cam, then locks it in such position until the end of the next half turn. When used in connection with automobiles, the automobiles during a half turn of the cam need run only a few feet. About one hundred and fifty feet has been found to be a satisfactory distance. Thus, if for example the vehicle runs one hundred and fifty feet for each half revolution of the cam the pointer would shift at each one hundred and fifty feet and indicate the quantity of the fuel used during the preceding one hundred and fifty feet. As the fuel consumption does not vary greatly in a hundred and fifty feet of running, under ordinary circumstances, the gage indicates within a very close degree the amount of fuel being used at any particular time. Further, as the value indicated is for a constant value of distance, a corresponding ratio value may be used thus by suitable characters upon the dial the meter may register gallons per mile.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. The combination with a pump having an expansible chamber adapted to be variably controlled and actuating means therefor, of a rotatable member, connecting means linking said rotatable member with said pump chamber whereby the extent of rotation of said rotatable member corresponds to the contracting movement of said pump chamber, a rotatable wheel member, means yieldably connecting said wheel member with said rotatable member, a brake normally engaging said wheel member, said brake being periodically actuated by said pump actuating means so as to momentarily disengage said wheel member when said pump chamber is contracted, said yieldable means adapted to rotate said wheel during the periods it is disengaged from the brake whereby during such periods said wheel occupies positions corresponding to those of said rotatable member.

2. In a combined pump and indicator, a variable volume, variable stroke pump, actuating means therefor, and an indicator means including a driving element actuated by said pump in accordance with its stroke, a driven element, yieldable means linking said driving and driven elements, and brake means normally locking said driven element, said pump actuating means being arranged to periodically disengage said brake means from said driven element whereby said driven element assumes during such disengagement, positions corresponding to those of said driving element.

In testimony whereof, I have hereunto set my hand at San Diego, California, this 24th day of November, 1928.

ALBERT J. GLICK.